Jan. 12, 1971 H. F. HEATH, JR, ET AL 3,555,517

EARLY ERROR DETECTION SYSTEM FOR DATA PROCESSING MACHINE

Filed Oct. 30, 1968 4 Sheets-Sheet 1

INVENTORS
HAROLD F. HEATH, JR
SAMIR S. HUSSON

BY [signature]
ATTORNEY

EARLY ERROR DETECTION SYSTEM FOR DATA PROCESSING MACHINE

EARLY ERROR DETECTION SYSTEM FOR DATA PROCESSING MACHINE

Filed Oct. 30, 1968

EARLY ERROR DETECTION SYSTEM FOR DATA PROCESSING MACHINE

Filed Oct. 30, 1968 4 Sheets-Sheet 4

United States Patent Office 3,555,517

Patented Jan. 12, 1971

3,555,517

EARLY ERROR DETECTION SYSTEM FOR DATA PROCESSING MACHINE

Harold F. Heath, Jr., Poughkeepsie, and Samir S. Husson, White Plains, N.Y., assignors to International Business Machines Corporation, Armonk, N.Y., a corporation of New York Filed Oct. 30, 1968, Ser. No. 771,791
Int. Cl. G06f *11/12*
U.S. Cl. 340—172.5 8 Claims

ABSTRACT OF THE DISCLOSURE

A system is provided for the detection of errors in a digital computer system during a machine cycle in which the units giving rise to the error are not actively contributing to the function being performed. If the error occurs in a nonoperational functional unit, a wait cycle routine may be entered which insures that the funcional unit in which the error occurred will not be utilized by the computer system during the next cycle. The functional unit is again tested during the wait cycle and if found to be in error again, the error routine is entered.

This invention relates to the detection of errors in a digital computer. More particularly, the invention relates to the detection of errors in functional units of the computer during a cycle in which the functional units are not involved in the computation.

Considering the large number of components used in a computer, the reliability thereof becomes a problem. The large number of errors which can occur in a computer have been classified generally as either "solid" errors or "transient" errors. The "solid" error usually occurs because of the failure of the components in the system, whereas the "transient" error is one that may be intermittent such as might be caused by noise or other transient environmental conditions. Various schemes of error detection and correction have been devised and utilized in connection with computers. Probably the most widely known is the parity checking scheme which basically provides a number of bits which should have a predetermined value unless an error has occurred. Accordingly, if a partiy check is made on data before it enters a particular functional unit and the check is again made at the output of the functional unit, it can be determined whether the error was introduced by the functional unit. In response to the error indication from a parity check, various procedures can be set in motion. For example, retry may be initiated which consists of sending the data back through the same functional unit to determine whether the error occurs again. If the error continues to occur as the functional unit is retryed, then the error is considered a "solid" error, as previously mentioned, and an error routine is entered. However, if on retry the error has disappeared, then the computation within the computer continues as the error is considered to be transient. It will be appreciated, that this type of error detecting indicates an error only after the computational data has been multilated by the malfunctioning functional unit. Accordingly, if the error is determined to be "solid," it is necessary to go back to either the beginning and restart the job in the computer or to go back to a previously determined check point. These are points where the data is read out into auxiliary storage means where it is stored so that the computation can be returned to this point for restart once the unit giving rise to the failure has been fixed.

It would be very advantageous to discover a failed functional unit before it introduces an error into the data being processed. The present invention provides a means for discovering the failure of non-operational units before the error affects data. It has been found by observation that during any given machine cycle the functional units utilized in the computation average less than half the functional units available. Accordingly, an average of over half the functional units are not being utilized in any given machine cycle. The present invention provides a system operable within a computer for determining whether any functional unit is operational or non-operational during the given cycle. If the functional unit is found to be operational, and an error occurs, an error routine is entered in the usual manner. However, if the functional unit is found to be non-operational, then a test word is utilized in the functional unit to determine whether an error has been introduced. If an error has been introduced, a wait cycle is initiated to again pass the test data through the functional unit to determine whether the error occurs again. If the error re-occurs, the system enters the error routine. However, if the retry does not indicate an error, the wait cycle is cancelled and the computation allowed to continue. Since the testing is performed when the functional unit is non-operational, the error is discovered before the computational data is introduced so that the error is detected before the data is multilated.

There are many advantages in detecting a fault in a functional unit before the unit can affect the computational data of the problem in the computer. If it is found that a "solid" error occurred, the computational data can be stored in an auxiliary storage facility until the failed functional unit is repaired. Thus, a check point need only be established if an actual "solid" error occurs. This results in establishing fewer check points and does not require any back up to the closest preceding check point. Early detection of the failure or error would also be advantageous in connection with the reconfiguration schemes. It will be appreciated, that the reconfiguration could take place before the computational data is mutilated. There are also various other schemes for continuing the operation of a data processing system in spite of a malfunction. In one such system, for example, copending patent application Ser. No. 744,950, filed by the same inventors and assigned to the same assignee, entitled, "Data Processing System Capable Of Operation Despite A Malfunction," could be simplified by the use of the present early error detection system. In that system, it is necessary to have auxiliary registers in which the information is stored so that the correct information is available for processing serially through an operational part of the functional unit when the other parts of the unit have failed. The data processing system continues to operate despite the malfunction. Thus, discovering the error by the early error detection means of the present invention would eliminate the need for storing the information in the auxiliary registers.

Accordingly, it is the main object of the present invention to provide a system for detection of errors in functional units before they are utilized in the computation.

It is another object of the present invention to provide a system of early error detection which includes means for determining whether the error is a "solid" or a "transient" error.

It is a further object of the present invention to provide an early error detection system in which the integrity of the computational data is not effected.

It is another object of the present invention to provide an early error detection system which distinguishes between operational and non-operational functional units.

It is a further object of the present invention to provide a counting means operable in connection with the early error detection system to provide an indication of the system reliability.

The invention resides in a digital computer having a plurality of functional units which are available for operation simultaneously in any given machine cycle. Means are provided for determining whether a functional unit is operational or non-operational during any machine cycle. A test word is introduced into the functional unit in response to a non-operational determination to determine the operational integrity of the functional unit. Each functional unit has an error indicating means associated therewith to indicate the occurrence of an error in the test data indicative of a failure in the associated functional unit. A predetermined computer routine is introduced in response to the error indication.

The foregoing and other objects, features and advantages of the invention will be apparent from the following more particular description of a preferred embodiment of the invention, as illustrated in the accompanying drawings.

BASIC ENVIRONMENTAL SYSTEM

The invention will be described and shown in the environment of an electronic digital computer containing a read only control storage which controls execution of sorted program instructions. The invention is not limited to this type system but may be used in data processing machines which do not utilize a read only control storage, and in "special purpose computers" which are built specifically to perform only one (or a very limited number of) tasks, and which have a "program" built into the hardware of the machine.

The data processing system in which the present invention will be described typically includes storage, a central processing unit (CPU), a system control unit and some form of input/output (I/O) unit. Such a system is described in the following references:

(1) U.S. Pat. 3,453,600 entitled, "Improved Program Suspension System," by Matthew A. Krygowski and Thomas S. Stafford;

(2) "IBM System/360 Principles of Operation" Form A22–6821;

(3) "System/360 Model 50, Comprehensive Introduction" Form 223–2821;

(4) "Microprogramming Manual for the IBM System/360 Model 50," by S. S. Husson, Oct. 2, 1967, IBM Technical Report, TR 00.1479–1;

(5) "Microprogram Control for System/360," by S. G. Tucker, IBM Systems Journal, vol. 6, No. 4, 1967, pages 222–241.

The details of the basic environmental system as disclosed in the above references are hereby incorporated by this reference into this specification for the purpose of teaching the operation of a basic environmental system. Additional attention will be directed to those references hereinafter where appropriate to further identify details helpful in understanding the system operation.

Figure 1:
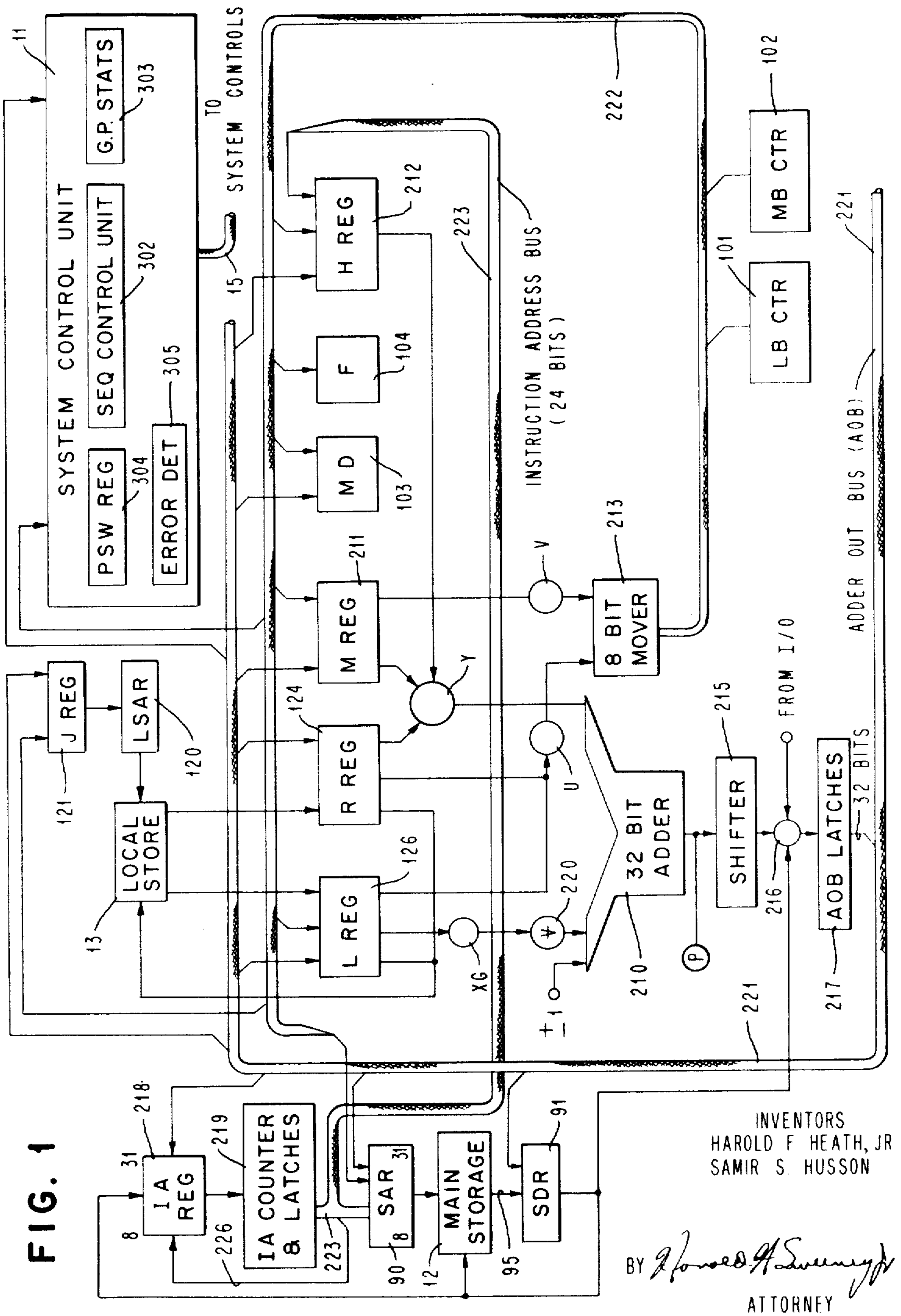
FIG. 1 is a schematic block diagram of an environmental data processing system wherein this invention may be used.

With reference to FIG. 1, the system storage includes main storage (MS) 12 and local storage (LS) 13. Although no special input/output units are shown, such units are well known and communicate with the FIG. 1 system through the gating network 216 into the adder output bus (AOB) latches 217 onto the (AOB) 221. The system control unit 11 controls the system operation by opening and closing gates and establishing other control signals at extensive locations throughout the system. Since such gating and control signals and their implementation are well known, they are collectively represented by the output bus 15. Specific control signals important to the present invention will be discussed further hereinafter. The remainder of the circuitry shown in FIG. 1 is generally considered part of the CPU. The CPU and the system have the capability of executing store-in-place instructions.

MAIN STORE

The main storage (MS) 12 may be physically integrated with the CPU or constructed as a stand-alone unit. The storage cycle speed is not directly related to the internal cycling of the CPU, thereby permitting an efficient relationship of CPU speed to storage size. Fetching and storage of data by the CPU are not affected by any concurrent I/O data transfer.

The main store 12 is preferably a matrix array of magnetic cores where a given address in the array is selected by signals in the storage address register (SAR) 90. When the SAR 90 contains a main store address, the main store 12, under its own internal timing controls, operates through its basic memory cycle to read information onto output sense lines 95 into the storage data register (SDR) 91. From SDR 91, data may be regenerated back into MS 12 and through the gating circuitry 216, the AOB latches 217, onto the adder output bus (AOB) 221.

The basic memory cycle includes a read half cycle in which data are destructively read out from main storage into the SDR followed by a write half cycle in which the information in the SDR is regenerated back into main storage. By placing different information into the SDR 91 prior to regeneration on the write cycle, the information that was in main storage may be effectively changed. Simultaneously with the regeneration cycle, the information in the SDR 91 becomes available to the system on the AOB 221. For further details as to the timing, control, and general operation of MS 12, reference should be made to the above-identified Krygowski et al. U.S. Pat. No. 3,453,600.

The information format of the environmental system organizes 8 bits into a basic building block called a "byte." Each byte also includes a ninth bit for parity used in error detection. The parity bit cannot be effected by the program, its only purpose being to cause a system interruption when a parity error occurs. It is assumed that the parity bit will be associated with bytes and that the normal parity checking circuitry is included throughout the system in the well known manner.

Two bytes are organized into a large field defined as a half-word, and four bytes or two half-words are organized into a still larger field called a word. More specifically, a "word" is defined as four consecutive bytes in the environmental system and will be treated as such in this invention. However, it will be understood that words or bytes can equal any number of bits.

Various data formats may be employed in the environmental system so that instructions and operands may be of different lengths depending upon the particular operation which is to be carried out.

Bytes are assigned locations in storage in consecutively numbered positions starting with zero. Each number is considered the address of the corresponding byte. A group of bytes in storage is addressed by the leftmost byte of the group. The number of bytes in the group is either implicitly or explicitly defined by the operation specified by the instruction. The addressing arrangement uses a 24-bit binary address to accommodate a maximum of 16,777,216 byte addresses. This set of main storage addresses includes some locations reserved for special purposes.

Storage addressing wraps around from the maximum byte address to the zero address. Variable-length operands may be located partially in the last and partially in the first location of storage, and are processed without any special indication of crossing the maximum address boundary.

Fixed-length fields, such as half-words and double-words, must be located in main storage on an integral boundary for that unit of information.

A boundary is called integral for a unit of information when its storage is a multiple of the length of the unit in bytes. For example, words (4 bytes) must be located in storage so that their address is a multiple of the number 4. Variable-length fields are not limited to integral boundaries, and may start on any byte location.

LOCAL STORE

Local store (LS) 13 consists of 64 one-word capacity registers which are addressed by the local store address register (LSAR) 120. The LSAR 120 is loaded from the J register (J REG) 121 which is in turn fed from the AOB 221 or the mover out bus (MOB) 222. Whenever a read operation is specified from LS13, the addressed word in LS 13 is read out either to the L register (L REG) 126 or to the R register (R REG) 124. The L and R registers have their outputs gated either back to the LS 13 or to the adder 210.

Local store 13 has a READ and WRITE operation similar to that of the main store 12 and the specific details of operation will be found in the above-mentioned Krygowski et al. U.S. Pat. No. 3,453,600.

Sixteen of the 64 one-word locations in LS 13 are designated as general registers which are used as index registers in address arithmetic and indexing, and used as accumulators in fixed-point arithmetic and logical operations. These general registers are identified by numbers 0–15 and are specified by a 4-bit field in instructions. Additionally, LS 13 includes working store (WS) locations which are used for various purposes throughout processing.

CENTRAL PROCESSING UNIT (CPU)

There are three basic data-bus lines that are different in width, and through which data is channeled from one register to another. These are the 32-bit adder-out bus (AOB) 221, the 24-bit instruction-address bus (IAB) 223, and the 8-bit mover-out bus (MOB) 222.

The basic environmental system data flow consists primarily of two parallel paths which may be activated simultaneously. One is the 32-bit wide adder path including the adder 210 which is fed by the several 32-bit registers L, R, M and H. The other path is the 8-bit wide logical mover path including the 8-bit mover 213 fed by the L, R and M registers. The mover manipulates one-byte blocks in half-byte increments.

In addition to the adder and mover data paths, four other data paths are of interest in describing the basic environmental system. Mainly, the shifter, instruction address, local storage, and main storage data paths.

The adder is capable of performing both binary and decimal arithmetic. Decimal arithmetic is performed by doing a binary add (true or complement) and generating a decimal correction factor into the L register in the same CPU cycle. Another cycle is needed to subtract the correction factor from the results of the preceding cycle. The adder 210 includes, besides 32 individual adder units, four parity checking circuits (one for each byte), four parity generating circuits (one for each byte), as well as carry look-ahead circuitry. When performing arithmetic functions, data are gated to the right-adder input Y from the 32-bit register H, M, or R. The left adder input XG contains a true/complement gate 220 and is fed by the 32-bit L register 126.

In a single CPU cycle, two 32-bit operands are gated one each into the XG and Y adder inputs, passed through the adder and continue on to set the adder output latches 217. At the end of the CPU cycle, the adder output is in the latches 217 ready to be gated out into an operating register. In the basic environmental system, subtraction is achieved by use of the two's complement which is controlled by the true/complement gate 220 on the XG input. When the complement gate is set, bits gated into XG will be inverted (i.e., one's become zeros and zeros become ones), thus forming the one's complement of the original XG input. The two's complement is achieved by inserting a carry into the XG adder input. Multiplication and division are accomplished using the adder by taking successive additions and subtractions. The various gating and control signals necessary to carry out the adder functions described emanate from the system control unit 11 which will be described in more detail hereinafter.

The shifter data path runs from the adder 210 to the AOB latches 217 and enables the adder output to be shifted to the left or the right either one or four places. Additionally, the shifter 215 includes means not shown for saving and storing the overflow portions of any shifted data. Again, the shifter is controlled by the system control unit 11.

The mover data path is used primarily for the execution of variable-field-length (VFL) instructions. Two byte sources may be selected simultaneously for a logical operation by the mover. The left-mover input, U may be a byte selected from the L or R register under control of one of the two byte counters LB 101 and MB 102 or a byte formed by the contents of the two four-bit registers MD 103 and F 104. The right mover input, V, is a byte selected from the M register 211 under control of either byte counter LB or MB. The mover, like the other data paths, is controlled by the system unit 11.

The instruction address data path is 24 bits wide for moving and updating the 24-bit instruction contained in the instruction address register 218. The first instruction is initially set in the instruction address register (IAR) by the system control unit 11. Instructions are gated from the IAR 218 to the instruction address counter and latches 219. The instruction address counter increments the instruction address by the appropriate number of bytes (6 bytes in the case of restore in place or SS instructions) and places that updated address in the IAR via the bus 226. The current instruction address, before updating, represents the location in the main store 12 of the current instruction to be executed and it is read into the storage address register (SAR) 90, gated to the main storage 12, and causes the addressed instruction to be read out into the storage data register (SDR) 91. Instructions read out from main store 12 into the SDR pass through the gating circuitry 216 to the AOB latches 217. The sequence of gating out an instruction is called I-fetch and is broken down into first and second level I-fetch. During I-fetch, the instruction is read out and is used to set up the CPU and local store with various initial conditions prior to commencement of execution.

The system control unit 11 includes a sequence control unit 302, general purpose stats 303, a program status word (PSW) register 304, and error detection circuitry 305.

SEQUENCE CONTROLS

Figures 2, 3:
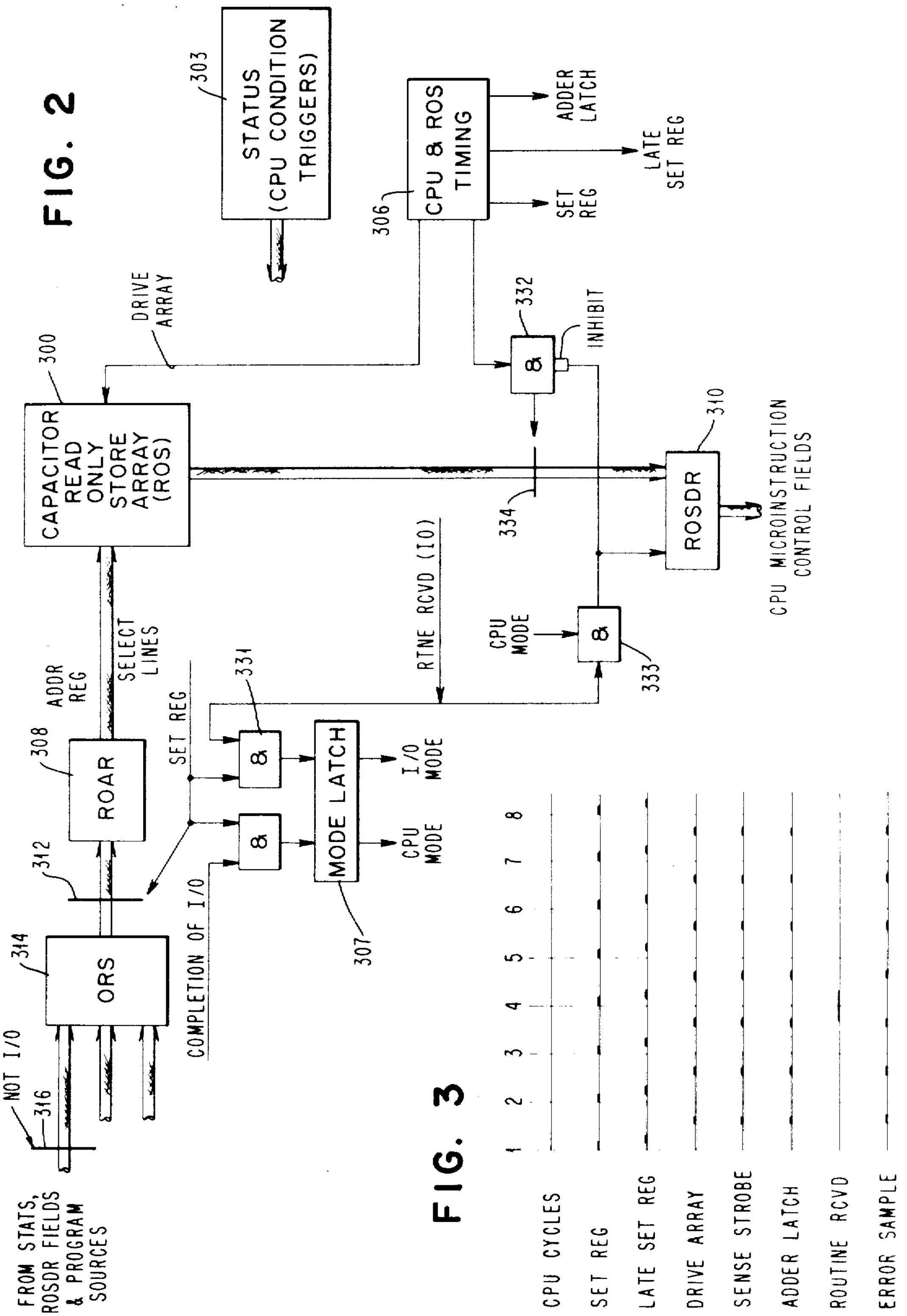
FIG. 2 is a diagram of the general organization of the sequence controls of the central processing unit of the environmental system.
FIG. 3 is a time chart of the timing circuit 306 shown in FIG. 2.

Reference is made next to FIGS. 2 and 3 which show the sequence controls for the data processing system. The sequence controls include a capacitor read only store (ROS) 300 of the type described in an article entitled, "Read Only Memory" by C. E. Owen et al. on pages 47 and 48 of the IBM Technical Disclosure Bulletin, volume 5, No. 8, dated January 1963. The controls also include a mode latch 307, condition triggers 303, also known as STATS, and timing circuits 306. The timing circuits 306 produce five cyclic signals at the CPU frequency which are phased with respect to the zero time reference of each CPU cycle as shown in FIG. 3.

Data in the read only store is addressed by a twelve-bit selection register (ROAR) 308. Address signals for the ROAR may be taken from various sources including a portion of the output control information from the read only store data register (ROSDR) 310 in each CPU cycle to select one of the 2,816 ninety-bit control words which are used in the environmental system and to enter the same in the read only storage data register 310. Actually, a twelve-bit ROAR register is capable of addressing 4,096 discrete locations. Each word, known as a microinstruction, is transferred into the read only store data register 310 at SENSE STROBE time which occurs just prior to the start of the next CPU cycle, and it controls the operation of the central processing unit during the next cycle.

The state of the read only store address register 308 is determined prior to the Drive Array pulse (FIG. 3) and controls the state of the read only store data register 310 at the following SENSE STROBE time. Thus, each entry into the read only store address register 308 usually controls the activity of the CPU in the next consecutive CPU cycle following the entry.

Each entry into the ROAR is determined in one of several different ways by the inputs presented to gates 312 through a network of OR gates 314. Ordinarily the 12 bits presented to the OR network 314 are derived selectively through gates 316 from one or more sources including a segment of the ROSDR, output conditions registered by selected condition STATS 303 and selected program branching information (program instruction operation codes).

The preceding discussion has presumed that the mode latch 307 is set to CPU mode and that CPU operation has not been interrupted by any input-output (I/O) units. Requests from I/O units are recognized by receipt of a Routine Received (RTNE RCVD) signal. It may be seen from the inputs to the AND gate 331 in FIG. 2 that, if the CPU is in the CPU mode when a RTNE RCVD signal is received, the mode latch 307 is not set to the I/O mode until SET REG time of the cycle following the rise of RTNE RCVD. This permits the CPU to complete execution of the current microinstruction. It the CPU mode is up when the RTNE RCVD signal is received, the AND gate 333 is operated to provide an output level which is up, and this level inhibits the AND circuit 332, thereby suppressing the SENSE STROBE signal of sense gates 334 which normally supply input signals to the read only storage data register 310 from the read only store 300. This will permit the I/O request to be serviced in the manner described and claimed in the above-referenced U.S. Pat. No. 3,453,600.

DETAILED DESCRIPTION OF THE INVENTION

The invention will be described in connection with the adder functional unit shown in FIG. 1 and described above. It will be appreciated, that the invention is not limited to the adder function but is applicable to any function within the computer. Actually, the functional unit does not necessarily have to change the data (such as an adder) but it may be a unit which does not affect the data passing through it, such as a register or a data bus. During any cycle of the machine, each function is under the control of a particular control word. This control word is shown in the format of a ROS controlled machine although no such constraint is required. The ROS controlled words are found in the ROSDR 310 shown in FIGS. 2 and 4. The fields of the control words in the ROSDR are represented as C(F*i*), C(F*j*) . . . C(F*k*). Only the functional and necessary mechanization for carrying out the invention is shown in connection with control field C(F*i*). The various control lines necessary for the operation of the adder function unit are not shown in FIG. 4. An all zero control field configuration has been selected as the non-operational indicator. With respect to a machine cycle, we call F*i* operational if F*i* is required and non-operational if F*i* is not required, where F*i* represents the functional unit 210. During a non-operational cycle, standard practice requires that F*i* remain quiescent. The present invention exercises F*i* with test data during its non-operational cycles in order to determine if it has already failed. The bit lines (Sil . . . SiN) from C(F*i*) in 310 are OR'ed together in OR unit 410 whose output is inverted by inverter 412. Thus, F*i* 210 may either be operational (line S1 411 is up) or non-operational (S2 413 is up) during the present machine cycle. It will be appreciated that line S1 will be energized or up for any control field C(F*i*) configuration that is not completely zero. Likewise, if the control field is all zero's the inverter 412 will produce an output causing line S2 to be up indicating that the functional unit F*i* 210 is non-operational during that cycle of the machine.

Figures 4, 5:
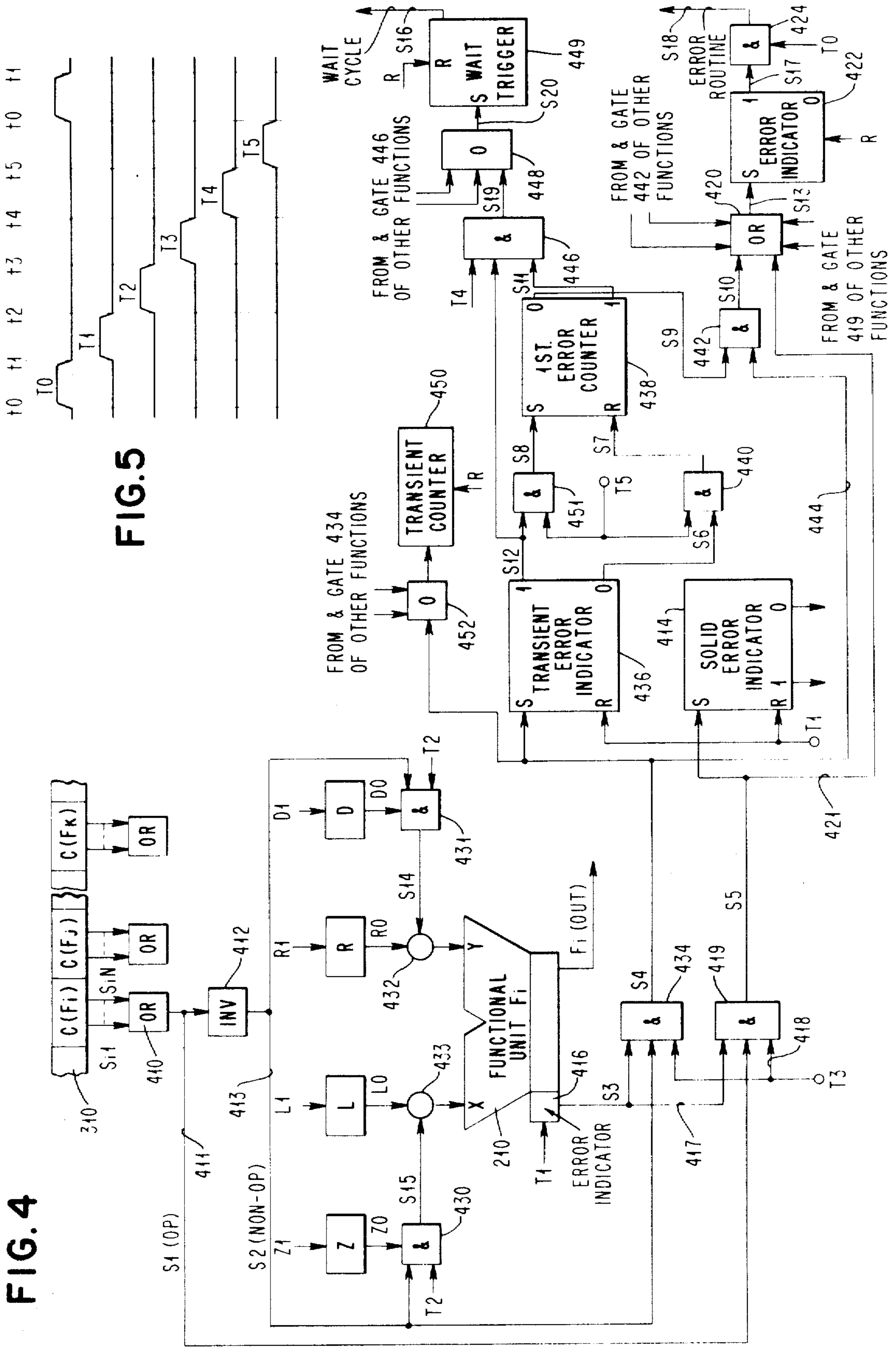
FIG. 4 is a schematic block diagram showing the invention operable in connection with the adder functional unit shown in FIG. 1.
FIG. 5 is a timing chart showing the timing for the operation of the embodiment shown in FIG. 4.

FIG. 5 shows a timing chart dividing each machine cycle into six time periods *t*0 through *t*5 between which time periods control signals T0–T5 are produced. During the occurrence of signal T0, AND CIRCUIT 424 is energized to produce an output signal S18 if the input signal S17 is present. The signal S18 inhibits the system from executing the next cycle by entering an error routine. The control field bit pattern C(F*i*) is set at time T1.

Assuming that the control field C(F*i*) does not contain the all zero pattern representing a non-operational unit, then the output line 411 of OR circuit 410 has a signal S1 thereon during time period T1 representing an operational condition of the functional unit 210. During this same time period T1, the solid error indicator 414 is reset. The functional unit 210 has completed its function at the end of period T2. If there is an error in the functional unit 210, its error indicator 416 is energized producing an output signal S3 on line 417 prior to *t*3. Output signal S3 forms one input to AND circuit 419. The arrival of time pulse T3 on input line 418 of AND circuit 419 along with signal S1 on line 411 causes an output S5 to be produced at the output of AND circuit 419. Output signal S5 sets the solid error indicator 414. Signal S5 is also connected to OR circuit 420 via line 421. The input of signal S5 to OR circuit 420 produces an output signal S13 which is applied to error indicator circuit 422. Signals S13 set error indicator circuit 422 so that it produces an output signal S17 which is connected to AND circuit 424. As previously mentioned, at time T0, AND circuit 424 is energized so that an output signal S18 is produced which initiates the error routine. Of course, if the error indicator 416 indicates that there is no error, the result of the functional computation of functional unit 210 is fed out in the usual manner and error indicator 422 is not energized.

Assuming that the control word C(F*i*) is all zeros so that a non-operational indication is provided by the existence of signal S2 on line 413 as a result of the output from inverter 412. Since functional unit 210 is non-operational as indicated by the condition of line 413, then it is desired to gate test data into the inputs X and Y of functional unit 210. The appropriate test data is located in test data registers Z and D. These registers can be located anywhere in the system. The test patterns contained in the registers Z and D are dependent on both the function to be tested (F*i*) and its past history. The outputs Z0 and D0 are gated from the registers Z and D, respectively, thru AND circuits 430 and 431. The AND circuits 430 and 431 produce their respective output pulse S15 and S14 only when they receive, simultaneously, time pulse T2 and signal S2 from line 413 indicating a non-operational condition for the functional unit 210. The signals S15 and S14 are connected to the respective X and Y inputs of the functional unit 210 through OR circuits 433 and 432, respectively. It will be appreciated, that the test data will be gated to the functional unit 210 only when the function is indicated as being non-operational. If there is no failure in the functional unit 210 indicated by no output from the error indicator 416, then AND circuit 434 does not produce an output during the time period T3. Accordingly, transient error indicator 436 is not set and the first error counter 438 is not set. It will be noted that AND circuit 434 requires the simultaneous input of signal S2 representing a non-operational condition of the functional unit 210, signal S3 indicating an error in the functional unit and timing pulse T3 to produce an output signal S4 which sets the transient error indicator.

If an error occurs in the functional unit 210, a predetermined routine is introduced. An output signal S3 will be obtained from error indicator 416 which is fed to AND circuit 434 the output of which will set transient error indicator 436 at T3 time. If there was no error in the previous cycle of the machine, then first error counter 438 is in the reset condition. This can be seen by noting that AND circuit 440 has two inputs, one from the transient error indicator 436 when it is in the reset condition and the other from the CPU timing circuit 306 at time period T5. Thus, AND circuit 440 produces an output signal S7 which resets first error counter 438 only when the transient error indicator 436 is in its reset condition. Consequently, error indicator 422 is connected to the set output of first error counter 438 through AND circuit 442 and OR circuit 420. The other input to AND circuit 442 is the output of AND circuit 434 via line 444. Thus, AND circuit 442 will produce an output only when AND circuit 434 produces an output and when first error counter 438 is in the set condition. The output of OR circuit 420 is utilized to set error indicator 422. However, the output of first error counter 438 in the reset condition serves as an input to AND circuit 446 which upon receiving time pulse T4 will produce an output if a simultaneous input signal is present from the set condition of transient error indicator 436. The output of AND circuit 446 passes through OR circuit 448 and sets the wait trigger 449 which produces an output signal S16 which is utilized to cause the machine to go into a wait cycle during which the normal operation of the machine is suspended and functional unit 210 is again tested for a malfunction to determine if the error was solid or intermittent. At T5 time of the same cycle, the output of AND circuit 451 will produce an output signal S8 when an input signal S12 is present as an input from the set condition of transient error indicator 436. This signal S8 is used to set first error counter 438. During the ensuing wait cycle, a test pattern is gated into the functional unit 210 during the T2 time period. If there is no error indicated by error indicator 416 during the wait cycle, then the previous error was obviously an intermittent error and can be ignored. Consequently, first error counter 438 is reset again at T5 time by the output of AND circuit 440, and the system returns to the operational program. However, if the functional unit 210 fails during the wait cycle, then an output is produced by error indicator 416 which forms an input to AND circuit 434 along with the input signal S2 indicating a non-operational condition of the functional unit and an input at T3 time. In response to these inputs, AND circuit 434 will produce an output on line 444 which forms an input to AND circuit 442 which already has another input from the set condition of the first error counter 438. Accordingly, AND circuit 442 will produce an output signal S10 which passes through OR circuit 420 to error indicator 422 which causes an error routine. The error routine is initiated since two successive errors have been indicated in the functional unit 210. The first error counter 438 can be a multistage counter rather than the two state device shown. Thus, a predetermined number of delays can be introduced during each of which the functional unit can be again tested to determine whether the error still occurs. The counter would indicate a reset condition for each state of the counter until the last stage when a set condition would allow the next S4 signal from AND circuit 434 to set error indicator 422 via AND circuit 442 and OR circuit 420.

The output of AND circuit 434 also drives a transient counter 450 through OR circuit 452. Whenever a failure occurs during a non-operational cycle in any of the functional units, the transient counter 450 is incremented by "1." The state of counter 450 is a measure of the operational reliability of the system. The transient counter 450 is essentially a warning device. The output of the counter 450 can be used to enter a test routine which will provide further information about the system reliability. Of course, there can be a separate transient counter for each function. This will permit a tighter control on system reliability.

The operation of the invention can be more clearly understood with reference to the timing chart of FIG. 5. The timing chart represents one complete machine cycle which is broken down into separate timing periods or pulses T0 through T5. However, in actuality, the machine time functions are not broken down into fixed time periods such as T0 through T5. The fixed time period arrangement is utilized for convenience of explanation only. In general, the functions of the system can be divided into two classes during evry machine cycle; namely, the operational and the non-operational functions. The number of functional elements which are operational is clearly unimportant because the failure in any one of them must stop the machine due to the uncertain effect on the operational program and its data sets. This is accomplished as shown in FIG. 4. The outputs from the AND circuits 419 of the various functional units in the system are OR'ed together in OR circuit 420. The output of OR circuit 420 is used to set the error indicator 422. If one or more of the functions fail, then the corresponding solid error indicators 414 are set and the error routine can determine which function failed by interrogating all those indicators.

Figure 6:
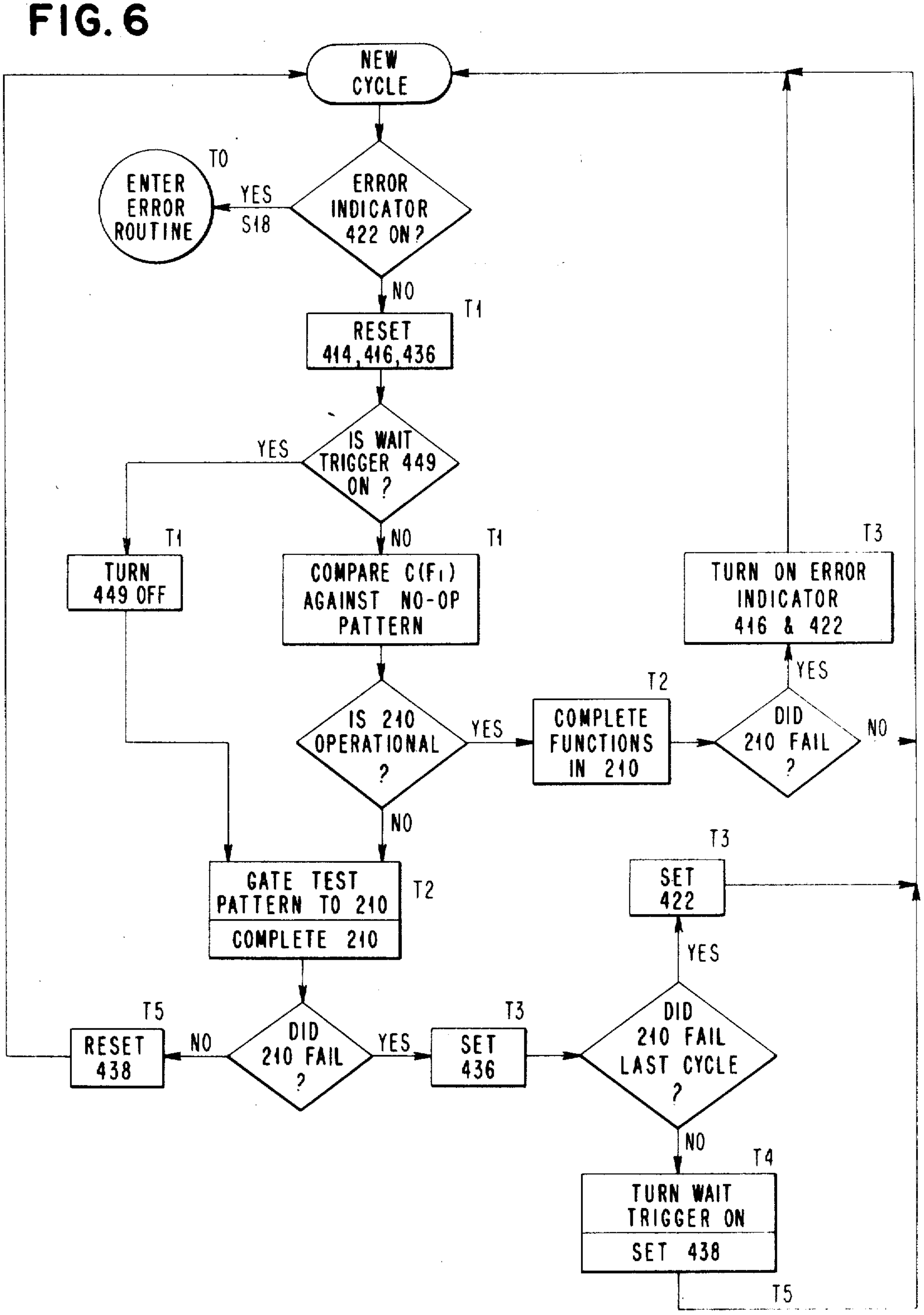
FIG. 6 is a flow chart illustrating the steps taken in conjunction with the embodiment shown in FIG. 4.

Referring to FIG. 6 which is a flow chart of operations, it can be seen that the new operation or cycle of the machine is entered at time T0. During this new cycle, if the error indicator 422 is on, the error routine is entered. If the error indicator 422 is not on, then at T1 time indicator 416, 414, and 436 are reset. It is also necessary during this time period T1 to determine if the wait trigger 449 is on. If the wait trigger 449 is on, it is turned off and new test data is gated to the functional unit 210 during the time T2. If the wait trigger 449 is not on, then it must be determined whether the functional unit 210 is to be operational or non-operational during the machine cycle. This is accomplished by determining whether the control word C(F*i*) indicates an operational or non-operational pattern. If the functional unit 210 is to be operational, then the computation is completed in functional unit 210 during time T2. If the error indicator 416 indicates a failure in functional unit 210, the error indicator 416 output causes error indicator 422 to turn on and an error routine will be entered at the beginning of the next cycle. If functional unit 210 did not fail, then the new cycle is entered into and the error indicator 422 is not on, therefore the operation proceeds as indicated above. If the functional unit 210 is to be non-operational during the machine cycle, then during time period T2 the test pattern stored in registers Z and D is gated to functional unit 210 where the operation on the data is completed. If functional unit 210 did not fail, then the first error counter 438 is reset at T5 time and a new cycle is again entered. If the functional unit 210 does fail, then the transient error indicator 436 is set at T3 time. If 210 failed last cycle, which is determined by the condition of first error counter 438, then the error indicator 422 is set and the error routine is entered at the beginning of the next cycle. If the functional unit 210 did not fail on the last cycle, then the wait trigger 449 is turned on at T4 time and the first error counter 438 is set at T5 time so that an error in functional unit 210 can set the error indicator 422. Thus, it will be appreciated that, if a non-operational pattern is obtained for a particular functional unit, test data can be gated to the unit to determine whether the unit has an error therein. If an error occurs, the arrangement is such that a wait cycle can be initiated during which the same functional unit is again tested to determine whether the error reoccurs. If the error reoccurs, then an error routine is entered. However, if the error does not reoccur, then the regular operational cycle is resumed. Using this detecting technique, the errors can be found before they actually affect the operational data. Consequently, various measures can be introduced to possibly prevent the shutdown of the machine because of a defective functional unit. For example, in a redundant system, the functional operation to be carried out by the defective unit can be transferred to a redundant functional unit.

While the invention has been particularly shown and described with reference to a preferred embodiment thereof, it will be understood by those skilled in the art that various changes in form and detail may be made therein without departing from the spirit and scope of the invention.

What is claimed is:

1. In a data processing machine;

a plurality of functional units capable of active operation in any given machine cycle;

control means operably connected to each of said functional units, said control means containing control signals indicative of an operational or nonoperational condition of each of said functional units in said given machine cycle;

means operably connected to said control means for generating a first signal for each functional unit in response to said control signals indicative of said operational condition of each said functional unit and a second signal for each functional unit in response to said control signals indicative of said non-operational condition of each said functional unit in said given machine cycle;

test means operably connected to each of said functional units and responsive to said second signal for introducing a test pattern into said functional unit to determine the operational integrity thereof by comparing the test pattern with a pattern of operational sensor signals;

error indicating means connected to each of said functional units for producing an operational error signal indicative of an error that has been introduced in each said functional unit during said machine cycle;

means responsve to said error signal and said second signal of any one of said functional units for generating a wait cycle signal to thereby energize the machine to wait a cycle during which testing of the associated functional unit can be again performed; and means responsive to said error signal and said first signal of any functional unit for energizing an error routine in the machine.

2. Apparatus according to claim 1, wherein said control means includes a control word located in a register, said control word being determinative of whether the connected functional unit will be actively operative or not during that machine cycle.

3. Apparatus according to claim 1, wherein said test means includes a test pattern located in one or more registers.

4. Apparatus according to claim 1, wherein counting means are provided operably connected to each of said functional units and energized to count only in response to said error signal from any error indicating means associated with any functional unit and when said second signal occurs, thereby providing an indication of the reliability of the machine made up of said functional units.

5. Apparatus according to claim 1, wherein means are provided responsive to a further error signal and said second signal from the same functional unit for energizing said error routine signal which energizing said error routine in the machine.

6. Apparatus according to claim 1, wherein said means for generating a wait cycle signal is energized for a predetermined number of successive error signals from said error indicating means in conjunction with said second signal from the same functional unit before said error routine signal is generated.

7. Apparatus according to claim 1, wherein said means for generating a wait cycle signal includes a transient error indicator bistable circuit followed by a first error counter, said transient error indicator bistable circuit intiating said wait cycle signal when said first error counter is in the reset condition, the error routine signal being generated in response to a set condition of said first error counter and a second error signal from said error indicator in conjunction with said second signal from the same functional unit, said first error counter being set by the first of said error signals produced.

8. Apparatus according to claim 7 wherein said transient error indicator bistable circuit produces a signal in its reset condition to reset the first error counter in response to a predetermined timing pulse so that a wait cycle signal can be generated in response to any subsequent error signals from said error indicator in conjunction with said second signal from the said functional units.

References Cited

UNITED STATES PATENTS

| | | | |
|---|---|---|---|
| 2,945,915 | 7/1960 | Strip. | |
| 3,303,474 | 2/1967 | Moore et al. | |
| 3,295,108 | 12/1966 | Harris et al. | 340—172.6 |
| 3,387,276 | 6/1968 | Reichow | 340—172.6 |

PAUL J. HENON, Primary Examiner

H. E. SPRINGBORN, Assistant Examiner

U.S. Cl. X.R.

340—146.1